United States Patent
Ogawa et al.

(10) Patent No.: US 6,810,075 B2
(45) Date of Patent: Oct. 26, 2004

(54) CDMA RECEIVER AND CDMA RECEIVING METHOD

(75) Inventors: Shinsuke Ogawa, Kanagawa (JP); Noriyuki Tsutsumi, Kanagawa (JP); Michihiro Ohsuge, Tokyo (JP); Yutaka Tomiyori, Tokyo (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 609 days.

(21) Appl. No.: 09/935,821

(22) Filed: Aug. 23, 2001

(65) Prior Publication Data

US 2002/0024992 A1 Feb. 28, 2002

(30) Foreign Application Priority Data

Aug. 23, 2000 (JP) .......................................... 2000-252621
Aug. 8, 2001 (JP) .......................................... 2001-241154

(51) Int. Cl.[7] ................................................ H04K 1/00
(52) U.S. Cl. ....................... 375/148; 375/150; 370/342
(58) Field of Search ................................ 375/148, 147, 375/349, 150; 370/342

(56) References Cited

U.S. PATENT DOCUMENTS

2001/0014116 A1 * 8/2001 Saito et al. ................. 375/148
2003/0026233 A1 * 2/2003 Ohsuge ...................... 370/342
2003/0039304 A1 * 2/2003 Terao ......................... 375/148

FOREIGN PATENT DOCUMENTS

JP          11-88247        3/1999
JP          2001-251212     9/2001

* cited by examiner

Primary Examiner—Temesghen Ghebretinsae
(74) Attorney, Agent, or Firm—Scully, Scott, Murphy & Presser (57) ABSTRACT

When the number of fingers assigned to a branch signal is smaller than the aimed number and there is a path to be added, the search is performed for an unused finger, firstly, and for one of fingers, the number of which is larger than the aimed number and which are assigned to the branch signal, which has the lowest receiving signal level, secondly. When the aimed number of fingers is satisfied and there is a path to be added, an unused finger is used if any and, when there is only an effective finger, the number of fingers assigned to a branch signal is not increased.

4 Claims, 8 Drawing Sheets

| Channel Open/Close | | | Finger Assignment | | | | | |
|---|---|---|---|---|---|---|---|---|
| BH1 | BH2 | BH3 | Finger1 | Finger2 | Finger3 | Finger4 | Finger5 | Finger6 |
| Open | Close | Close | BH1 | BH1 | BH1 | BH1 | BH1 | BH1 |
| Close | Open | Close | BH2 | BH2 | BH2 | BH2 | BH2 | BH2 |
| Close | Close | Open | BH3 | BH3 | BH3 | BH3 | BH3 | BH3 |
| Open | Open | Close | BH1 | BH1 | BH1 | BH2 | BH2 | BH2 |
| Open | Close | Open | BH2 | BH2 | BH2 | BH3 | BH3 | BH3 |
| Close | Open | Open | BH1 | BH1 | BH2 | BH3 | BH3 | BH3 |
| Open | Open | Open | BH1 | BH1 | BH2 | BH2 | BH3 | BH3 |

CDMA RECEIVER AND CDMA RECEIVING METHOD

BACKGROUND OF THE INVENTION

1. Field of the Invention

The present invention is utilized in a mobile radio communication system and, particularly, the present invention is utilized in a receiving circuit of a mobile terminal. The present invention relates to a receiver of a CDMA (Code Division Multiple Access) system. The present invention relates to an improvement of the diversity hand-over system in which a mobile terminal, which receives signals from a plurality of base stations, executes a hand-over from one of the base stations from which the mobile terminal is receiving a signal to another base station, while keeping the signal reception from the one base station. The present invention also relates to a novel control logic for assigning a number of detected receiving signal branches to a limited number of fingers. The present invention relates to an improvement of a rake receiving circuit, which is inputted with a number of branch signals, such that the rake receiving circuit can stably continue a signal receiving with minimum possibility of step-out when a hand-over is executed.

2. Description of Related Art

In order to perform a hand-over when a mobile terminal moves from one of a plurality of base stations to another, it is necessary to measure delay profiles of a plurality (3 at most) of cells or sectors, that is, branch signals (BH) to detect multiple paths. In a case where a diversity hand-over is performed with using a limited number of fingers in order to reduce the size of hardware, the fingers are distributed to the respective branch signals according to a system to be described below.

Figure 6:
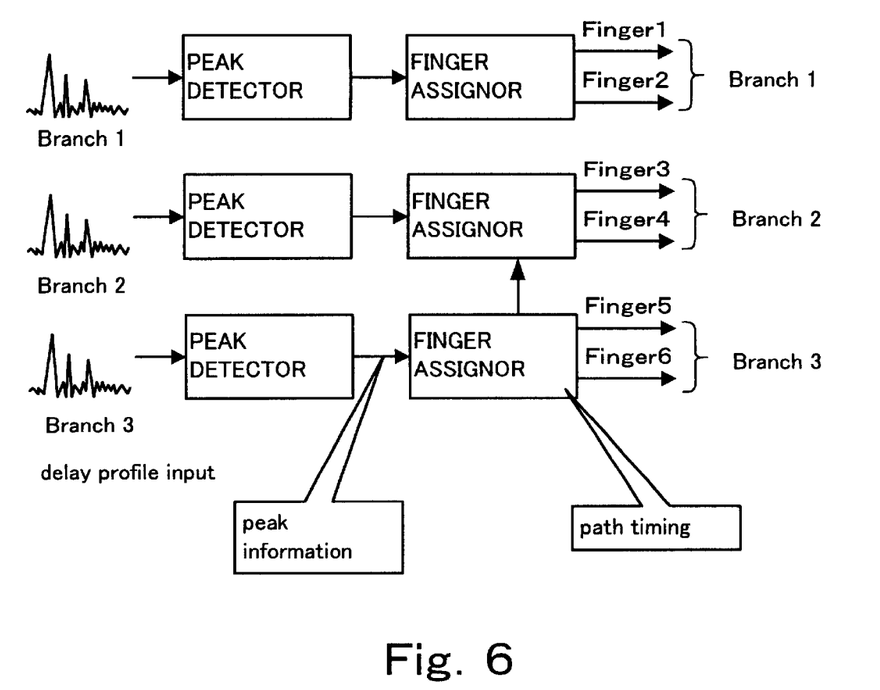
FIG. 6 is a signal flowchart of a fixed assignment system on 3 branch signal/6 finger case.
Figure 7:
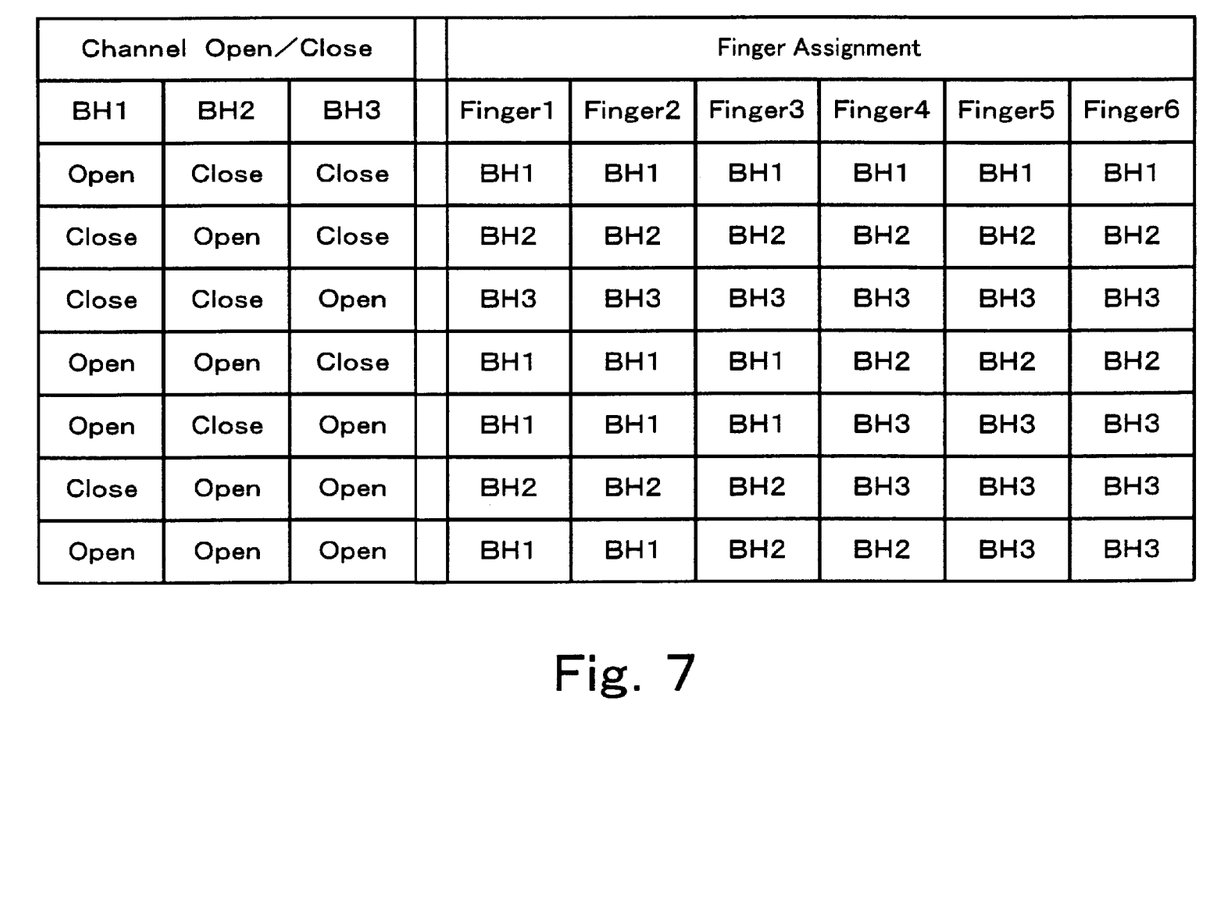
FIG. 7 shows an example of a fixed assignment pattern.

The system may be the fixed assignment system shown in FIG. 6, which shows a block diagram of the fixed assignment system schematically. In a hand-over, branch signals are assigned to fixed fingers, respectively. When a plurality (3 in this case) of branch signals are activated as shown in FIG. 6, a path searching for one branch signal is performed three times independently. Paths selected by the respective branch signals are assigned to the respective fingers according to a predetermined assigning pattern as shown in FIG. 7.

Figure 8:
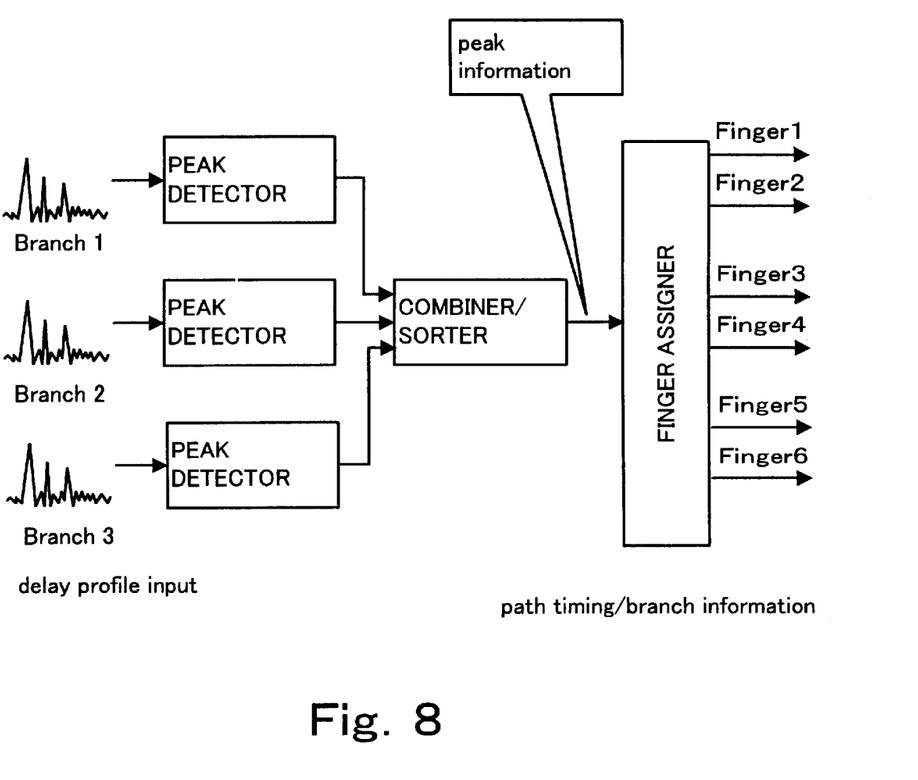
FIG. 8 is a block diagram of an adaptive assignment system on 3 branch signal case.

Another system may be the adaptive assignment system and FIG. 8 is a block diagram showing a construction of the adaptive assignment system schematically. Paths detected by the respective branch signals are assigned to fingers in order of level of the receiving signal or level of SNR (Signal to Noise Ratio) of receiving signal That is, after a peak detection is performed for each branch signal, the detected peaks of the branch signals are sorted in order of the level of the peaks or in order of level of SNR of the branch signals. Synchronization is determined on the basis of an information of the peaks of the branch signals after sorted. Therefore, the number of fingers to be assigned to each of the branch signals depends upon the state of paths.

Merits and demerits of the fixed assignment system will be described below.

[Merit] There is no need of switching the branch signals received by the respective fingers except a case where a branch signal is added or deleted.

[Demerit] There is a possibility of instantaneous cutoff of branch signals since a finger used is switched when a branch signal is added or deleted.

Merits and demerits of the adaptive assignment system will be described below.

[Merit] The effect of combining may be maximal since paths are assigned in order of SNR. Further, there is no instantaneous cutoff of branch signal when a branch is added or deleted.

[Demerit] Since the number of fingers assigned to a branch signal whose level or SNR is relatively low may be at least reduced, there is a possibility of step-off of the branch signal. Since, in such case, the sequence continuously requests an addition of a branch signal, there may be a flutter in addition or deletion of branch signal, so that the hand-over operation becomes unstable.

In view of the merits and demerits of the fixed assignment system and the adaptive assignment system, it has been requested to develop a novel system capable of providing the merits of these systems while removing the demerits thereof.

SUMMARY OF THE INVENTION

The present invention was made in view of the background mentioned above and an object of the present invention is to provide a CDMA receiver, which has no instantaneous cutoff of branch signal at a time of addition or deletion of branch signal, operates stably at a time of hand-over, has high utilization efficiency of finger and can improve a signal receiving characteristics.

Another object of the present invention is to provide a CDMA receiving method.

According to the present invention, when a new branch signal to be added generated under condition that the number of effective paths of an existing branch signal is larger than the number of fingers assigned to the existing branch signal and the number of fingers assigned to all branch signals is smaller than an aimed number of fingers, the new branch signal is assigned to an unused finger if any and, if there is no unused finger, an ineffective finger caused due to such reason as low receiving quality is switched to a finger for the new branch signal. The aimed number of fingers means the number of fingers per branch signal when the fingers are assigned equally to all of branch signals.

In the case where there is no unused finger, the numbers of fingers assigned to a plurality of other branch signals are compared with each other and, when the number of fingers assigned to one of the other branch signals, which is assigned to the largest number of fingers, is larger than the aimed number of fingers, a finger of fingers assigned to the one branch signal, which is lowest in level, is switched for a finger for the one branch signal.

That is, when the number of fingers assigned to the one branch signal is not larger than the aimed number and there is a path to be added, a finger to be replaced is searched for an unused finger first and for a finger among at least the aimed number of fingers assigned to a branch signal, which is in the lowest level, second.

In a case where the aimed number of fingers is satisfied and there is a path to be added, an unused finger is used if any. When there is only effective fingers, the number of fingers of the branch signal is not increased.

Since, according to such algorithm, there is no need of switching the branch signal received by the respective fingers every time a branch signal is added or deleted, there is no instantaneous cut-off and the hand-over operation can be stabilized. Further, by assigning an unused finger with highest priority, it is possible to improve the efficiency of finger use to thereby improve the signal receiving characteristics.

That is, according to a first aspect of the present invention, a CDMA receiver comprises an AD converter for converting analog receiving signals from a plurality of base stations into digital signals and outputting a plurality of branch signals to be transmitted through different propagation paths, a path searcher for assigning the branch signals to fingers according to delay profiles thereof, a plurality of finger portions to be assigned to the branch signals according to a finger assignment performed in the path searcher and a rake combiner for performing a maximum ratio combining of powers of a plurality of mutually delayed signals obtained from the fingers.

The CDMA receiver is featured by that the path searcher comprises a plurality of peak detectors provided correspondingly to the respective branch signals for detecting correlation peaks of the respective branch signals from the delay profiles of the branch signals and producing an information of peaks of the branch signals, respectively, a plurality of finger assignors provided correspondingly to the respective branch signals for assigning the branch signals to the finger portions according to the peak information and outputting path timings of the plurality of the finger portions and a finger distributor for setting an aimed number of fingers to be assigned to each of the finger portions according to the path timings such that the number of fingers assigned to each of the plurality of the finger portions becomes even for the plurality of the branch signals and feeding the numbers of fingers assigned to the respective finger portions, branch numbers of the fingers and the timing information back to the finger assignors.

The finger distributor preferably comprises means for assigning a branch signal to an unused finger or an ineffective finger having low receiving quality, when the branch signal is added.

According to a second aspect of the present invention, a CDMA receiving method includes the steps of converting analog receiving signals from a plurality of base stations into digital signals, outputting a plurality of branch signals to be transmitted through different propagation paths, assigning a finger to each of the branch signals according to delay profiles thereof, assigning the plurality of the branch signals to a plurality of fingers according to the finger assignment performed by the path searcher and performing a maximum ratio combining of powers of a plurality of mutually delayed signals obtained from the fingers.

This CDMA receiving method is featured by comprising the steps of detecting correlation peaks of the plurality of the branch signals from the delay profiles of the branch signals and producing an information of peaks of the branch signals, respectively, assigning the plurality of the fingers to the plurality of the branch signals according to the peak information and outputting path timings of the plurality of the fingers, setting an aimed number of fingers according to the path timings such that the number of fingers assigned to each of the plurality of the fingers is even for the plurality of the branch signals and feeding the numbers of fingers assigned to the respective fingers, branch numbers of the fingers and the timing information back to the finger assignors.

It is preferable that a branch signal is assigned to an unused finger or an ineffective finger having low signal receiving quality at a time when the branch signal is added.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

A construction of a CDMA receiver according to an embodiment of the present invention will be described with reference to FIG. 1, which is a block diagram showing the CDMA receiver, and FIG. 2, which is a block diagram showing a construction of a path searcher used therein.

Figure 1:
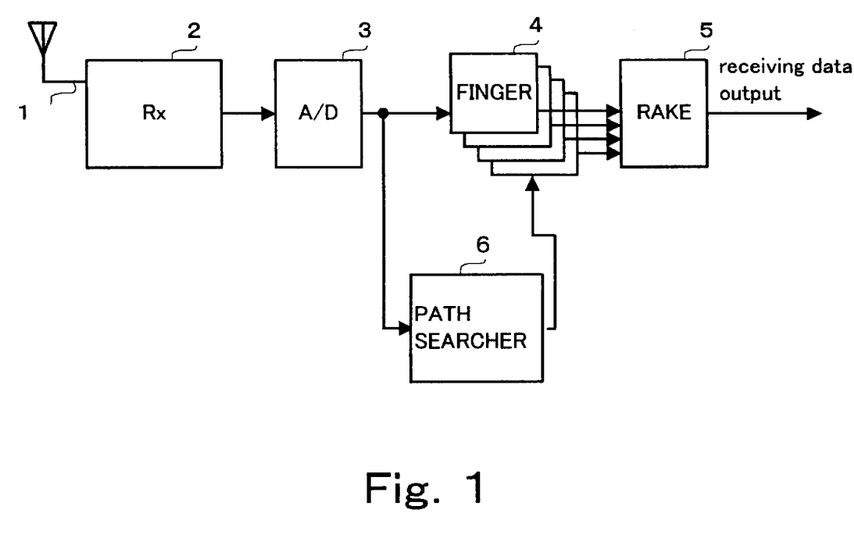
FIG. 1 is a block circuit construction of a main portion of a CDMA receiver according to an embodiment of the present invention.

As shown in FIG. 1, the CDMA receiver of the present invention comprises an antenna 1, a high frequency analog signal receiving circuit 2 for receiving analog signals from a plurality of base stations, an AD converter 3 for converting the received analog signals into digital signals and outputting a plurality of branch signals to be transmitted through different propagation paths, a path searcher 6 for performing a finger assignment of the branch signals to fingers from the AD converter 2 according to delay profiles thereof, a plurality of finger portions 4 to be assigned to each of the branch signals according to the finger assignment performed by the path searcher 6 and a rake combiner 5 for performing a maximum ratio combining of powers of a plurality of mutually delayed signals obtained from the fingers.

Figure 2:
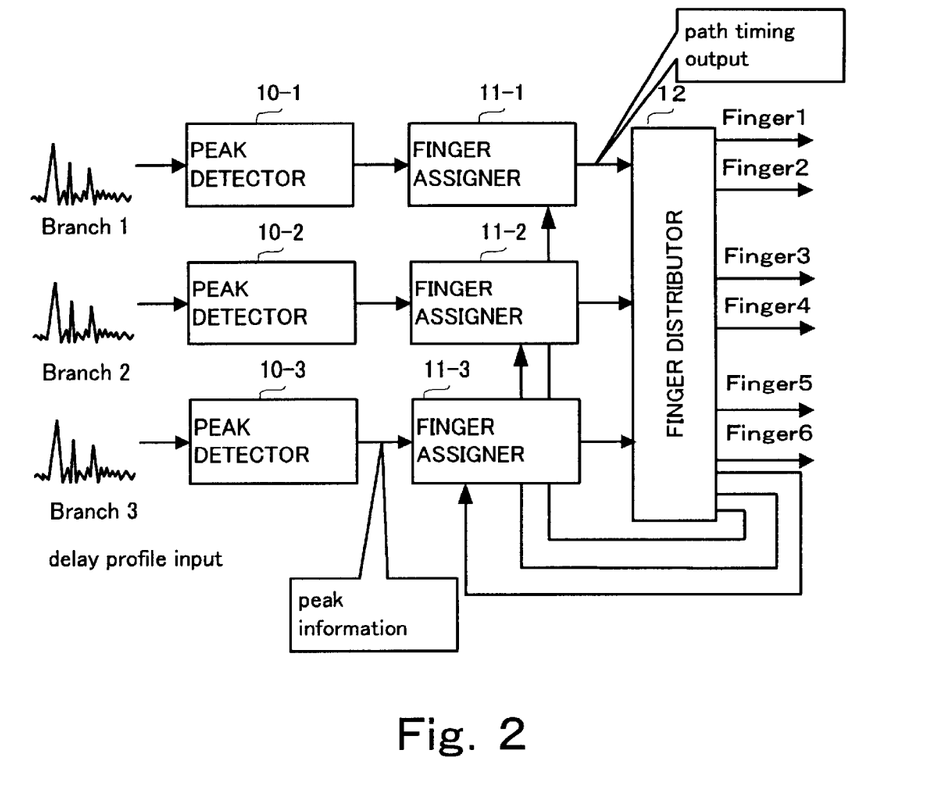
FIG. 2 is a block circuit construction of a main portion of a path searcher according to an embodiment of the present invention.

As shown in FIG. 2, the path searcher 6 comprises a plurality of peak detectors 10-1 to 10-3 provided correspondingly to respective branches 1 to 3 for detecting correlation peaks of respective branch signals on the basis of the delay profiles thereof and producing an information of peaks of the respective branch signals, a plurality of finger assignors 11-1 to 11-3 provided correspondingly to the respective branch signals for assigning the branch signals to the finger portions 4 according to the peak information and outputting path timings of the branch signals through the finger portions 4 and a finger distributor 12 for setting an aimed number of fingers to be assigned to each of the finger portions such that the number of fingers assigned to each of the plurality of the finger portions 4 becomes even for the plurality of the branch signals and feeding the numbers of fingers assigned to the respective finger portions 4, branch numbers of the fingers and the timing information back to the finger assignors 11-1 to 11-3.

When a branch signal is added, the finger distributor 12 functions to assign the branch signal to an unused finger or an ineffective finger having low signal receiving quality.

A CDMA receiving method according to the second aspect of the present invention is adapted to the CDMA receiver shown in FIG. 1. The CDMA receiving method includes the steps of converting analog receiving signals from a plurality of base stations into digital signals as branch signals, outputting a plurality of the branch signals to be transmitted through different propagation paths, assigning fingers to each of the branch signals according to delay profiles thereof, assigning a plurality of the branch signals to a plurality of fingers according to the finger assignment and performing a maximum ratio combining of powers of a plurality of mutually delayed signals obtained from the fingers, The CDMA receiving method is featured by comprising the steps of detecting correlation peaks of the plurality of the branch signals from the delay profiles of the branch signals and producing an information of peaks of the branch signals, performing a finger assignment of a plurality of the fingers to a plurality of the branch signals according to the peak information, outputting path timings of the respective fingers, setting an aimed number of fingers such that the number of fingers assigned to the respective fingers is even for the plurality of the branch signals and feeding the numbers of fingers assigned to the respective fingers, branch numbers of the respective fingers and the timing information back to the finger assignors.

When a branch signal is to be added, the branch signal is assigned to a finger, which is an unused finger or an ineffective finger having low quality of receiving signal at the time when the branch signal is added.

The embodiments of the present invention will be described in more detail. In FIG. 2, three branches are connected to the path searcher 6. The path searcher 6 functions to measure delay profiles of propagation paths of the branch signals and assign detecting positions, at which correlation peaks are detected, to the finger portions 4. The peak detectors 10-1 to 10-3 detect the correlation peaks on the basis of the delay profiles and the finger assignors 11-1 to 11-3 determine the finger assignment within the related base station.

The finger distributor 12 functions to determine the assigning rule of fingers for the respective branch signals (the numbers of fingers of the respective branch signals) by the state of things. That is, the finger distributor 12 determines an aimed number of fingers and distributes the aimed number of fingers to the respective branch signals. When there is any finger among fingers assigned to any one of the branch signals, which is ineffective due to degradation of signal receiving quality, though the number of the fingers assigned to that branch signal satisfies the aimed number, the finger distributor 12 can assign a more number of fingers than the aimed number to that branch signal.

Further, in order to avoid an excessive change of previously assigned fingers at a time when a branch signal is added, the finger distributor 12 selects an unused finger or an ineffective finger whose receiving level or SNR is lowest as a finger for the added branch signal.

Figure 3:
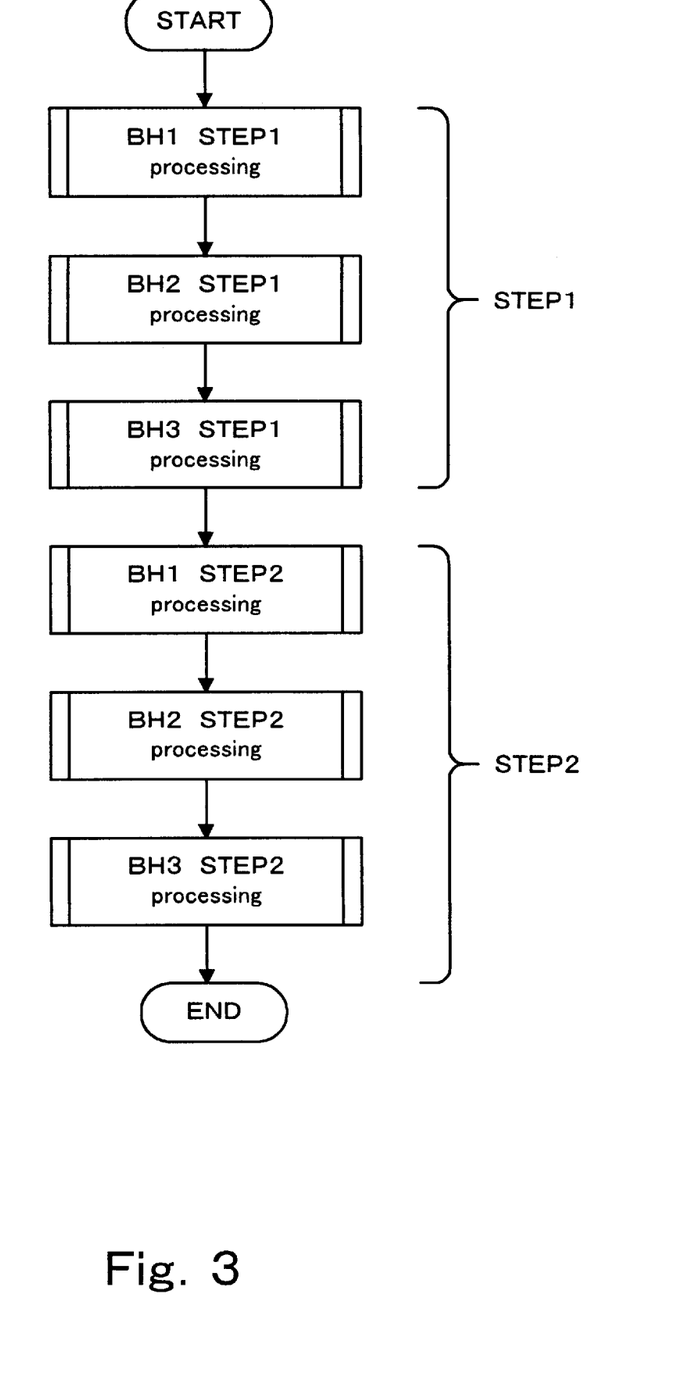
FIG. 3 is a flowchart showing a processing procedure according to an embodiment of the present invention.
Figure 4:
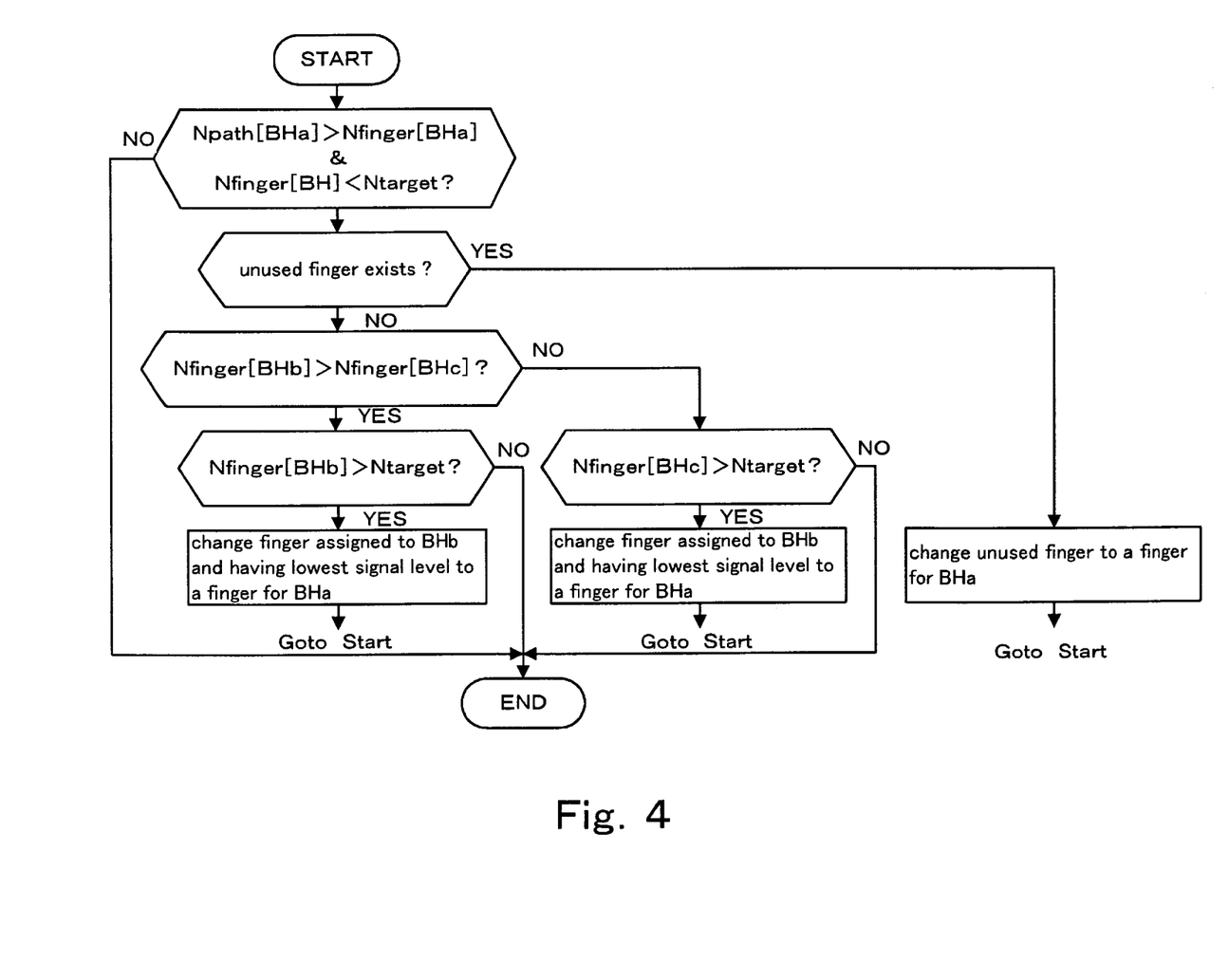
FIG. 4 is a flowchart showing a processing procedure in STEP 1.
Figure 5:
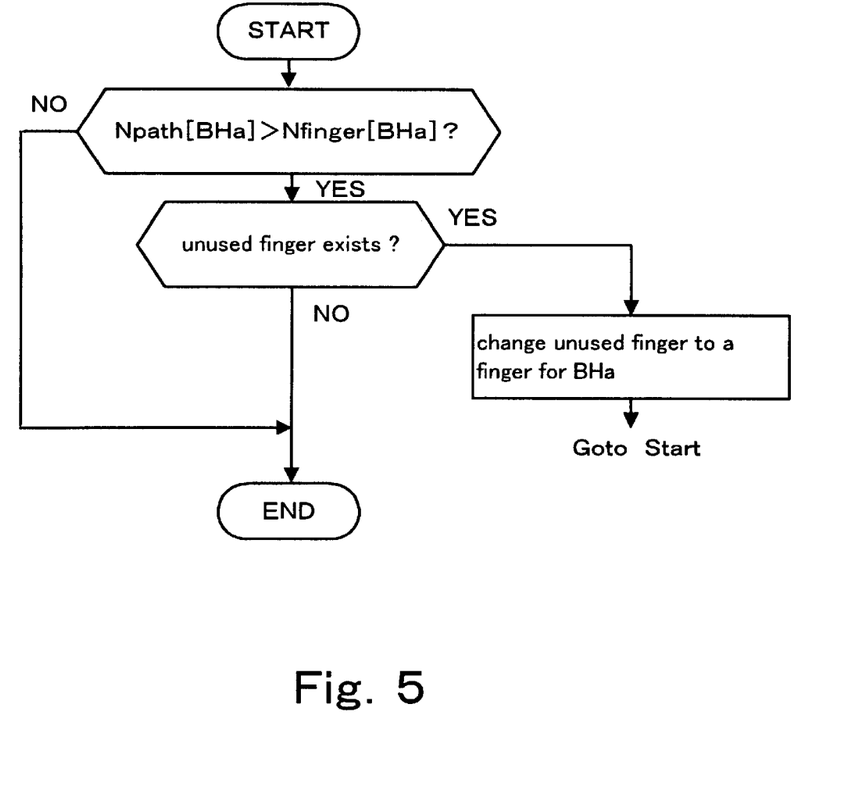
FIG. 5 is a flowchart showing a processing procedure in STEP 2.

FIGS. 3 to 5 are flowcharts showing an operation of the embodiment of the present invention. As shown in FIG. 3, a regulation of the finger assignment is performed through two steps, STEP 1 and STEP 2. The processing in the STEP 1 is shown in FIG. 4 and the processing in the STEP 2 is shown in FIG. 5. In the STEP 1 shown in FIG. 4, a processing for a case where there are branch signals the number of which is smaller than the aimed number of fingers is executed and, in the STEP 2 shown in FIG. 5, a processing for a case where there are branch signals the number of which satisfies the aimed number and there is a path to be added is executed. In FIGS. 4 and 5, Npath[BHa] indicates the number of effective paths of a branch signal BHa. Nfinger[BH] indicates the number of fingers assigned to all branch signals BH and Nfinger[BHa], Nfinger[BHb] and Nfinger[BHc] indicate the numbers of fingers assigned to the branch signals BHa, BHb and BHc, respectively. Ntarget indicates the aimed number of fingers. The aimed number of fingers means the number of fingers per branch signal when all fingers are assigned to activated branch signals on a per capita basis.

In the STEP 1 shown in FIG. 4, it is determined whether the number of effective paths of the branch signal BHa is larger than the number of fingers assigned to the branch signal BHa and the number of fingers assigned to all branch signals BH is smaller than the aimed number of fingers. If YES, it is determined whether there is an unused finger. If there is the unused finger, the latter finger is changed to a finger for the branch signal BHa. If there is no unused finger, it is determined whether the number of fingers assigned to the branch signal BHb is larger than the number of fingers assigned to the branch signal BHc. If NO, it is determined whether the number of fingers assigned to the branch signal BHc is larger than the aimed number. If YES, a finger assigned to the branch signal BHb and having the lowest level is changed to a finger for the branch signal BHa. In a case where there is no unused finger and the number of fingers assigned to the branch signal BHb is smaller than the number of fingers assigned to the branch signal BHc, it is determined whether the number of fingers assigned to the branch signal BHb is larger than the aimed number. If YES, a finger assigned to the branch signal BHc and having the lowest receiving signal level is changed to a finger for the branch signal BHa.

That is, in the STEP 1, when the number of fingers assigned to the branch signal BHa is smaller than the aimed number and there is a path to be added, the search is performed for an unused finger, firstly, and for one of fingers assigned to the branch signal and larger in number than the aimed number, which has the lowest receiving signal level, secondly.

In the STEP 2 shown in FIG. 5, when there is an unused finger, the unused finger is used and, when there is only an effective finger, the number of fingers for the branch signal is not increased.

Although, in the shown flowchart, the fingers for the branch 1 are predominant for simplification of the processing, a path to be assigned to an unused finger may be one of paths of all branch signals not assigned to fingers, which has the highest receiving signal level.

As described hereinbefore, according to the present invention, when a branch signal is added or deleted in performing a diversity hand-over by using a limited number of fingers, there is no instantaneous information cut-off and respective branch signals can be received relatively stably. Therefore, the operation during diversity hand-over becomes stably. Further, since an unused finger can be utilized in another branch signal, the utilization efficiency of finger is high and the receiving characteristics can be improved.

What is claimed is:

1. A CDMA receiver comprising:
   an AD converter for converting analog receiving signals from a plurality of base stations into digital signals and outputting a plurality of branch signals to be transmitted through different propagation paths;
   a path searcher for assigning the branch signals to fingers according to delay profiles thereof;
   a plurality of finger portions to be assigned to the branch signals according to a finger assignment performed in said path searcher; and
   a rake combiner for performing a maximum ratio combining of powers of a plurality of mutually delayed signals obtained from said fingers, wherein said path searcher comprises:
- a plurality of peak detectors provided correspondingly to the respective branch signals for detecting correlation peaks of the respective branch signals from the delay profiles of the branch signals and producing a peak information of the branch signals, respectively;
- a plurality of finger assignors provided correspondingly to the respective branch signals for assigning the branch signals to said finger portions according to the peak information and outputting path timings of the plurality of said finger portions; and
- a finger distributor for setting an aimed number of fingers to be assigned to each of said finger portions such that the number of fingers assigned to each of said finger portions is even for the plurality of the branch signals and feeding the numbers of fingers assigned to said respective finger portions, branch numbers of said fingers and the timing information back to said finger assignors.

2. A CDMA receiver as claimed in claim 1, wherein said finger assignors includes means for assigning a branch signal to an unused finger or an ineffective finger having low receiving quality, when the branch signal is added.

3. A CDMA receiving method including steps of converting analog receiving signals from a plurality of base stations into digital signals, outputting a plurality of branch signals to be transmitted through different propagation paths, assigning a finger to each of the branch signals according to delay profiles thereof, assigning a plurality of the branch signals to a plurality of fingers according to the finger assignment performed in a path searcher and performing a maximum ratio combining of powers of a plurality of mutually delayed signals obtained from said fingers, said CDMA receiving method comprising the steps of detecting correlation peaks of the plurality of the branch signals from the delay profiles of the branch signals and producing a peak information of the branch signals, respectively, assigning a plurality of said fingers to a plurality of the branch signals according to the peak information and outputting path timings of the plurality of said fingers, setting an aimed number of fingers such that the number of fingers assigned to each of the plurality of said fingers is even for the plurality of the branch signals and feeding the numbers of fingers assigned to said respective fingers, branch numbers of said fingers and the timing information back to the finger assignors.

4. A CDMA receiving method as claimed in claim 3, wherein a branch signal is assigned to an unused finger or an ineffective finger having low receiving quality at a time when the branch signal is added.

* * * * *